US012307507B2

(12) United States Patent
Suetsugu (10) Patent No.: US 12,307,507 B2
(45) Date of Patent: May 20, 2025

(54) CONTRIBUTION DEGREE CALCULATION SYSTEM AND COMPUTER PROGRAM PRODUCT

(71) Applicant: Katsunori Suetsugu, Tokyo (JP)

(72) Inventor: Katsunori Suetsugu, Tokyo (JP)

( * ) Notice: Subject to any disclaimer, the term of this patent is extended or adjusted under 35 U.S.C. 154(b) by 0 days.

(21) Appl. No.: 17/663,723

(22) Filed: May 17, 2022

(65) Prior Publication Data

US 2023/0005035 A1     Jan. 5, 2023

(30) Foreign Application Priority Data

Jun. 30, 2021 (JP) ................................ 2021-108624

(51) Int. Cl.
*G06Q 30/0601* (2023.01)

(52) U.S. Cl.
CPC ..... *G06Q 30/0641* (2013.01); *G06Q 30/0609* (2013.01)

(58) Field of Classification Search
CPC ......... G06Q 30/06–0645; G06Q 30/08; G06Q 50/01; G16Y 10/00–90; Y02P 90/30
See application file for complete search history.

(56) References Cited

U.S. PATENT DOCUMENTS

| 10,937,037 | B2* | 3/2021 | Chakraborty | .......... G06Q 30/02 |
| 2017/0148056 | A1* | 5/2017 | Hata | ................... G06Q 30/0277 |
| 2022/0101465 | A1* | 3/2022 | Ishida | .................. G06Q 50/184 |

FOREIGN PATENT DOCUMENTS

| JP | 2022102830 A | * | 7/2022 |
| WO | 2012166169 A1 | | 12/2022 |

OTHER PUBLICATIONS

"What is attribution? A way of thinking that aims to correctly understand diversifying customer behavior and improve conversation." cxclip.karte.io, Jun. 15, 2020, cxclip.karte.io./glossary/attribution. Accessed Mar. 20, 2024. With Machine Translation.
"Summary of attribution analysis examples." Satori, Sep. 4, 2015, satori.marketing/marketing-blog/attribution/. Accessed on Mar. 26, 2024. With Machine Translation.

* cited by examiner

*Primary Examiner* — Adam L Levine
(74) *Attorney, Agent, or Firm* — Rosenberg, Klein & Lee (57) ABSTRACT

Provided is a contribution degree calculation system and computer program product for calculating the degree of contribution of "displays" serving as means for mediating supply and purchase of a product and/or service between a user who considers purchase of the product and/or service and a supplier that supplies the product and/or service.
The contribution degree calculation system includes a user action history acquisition unit that acquires the user action history, which is the history of actions taken by the user through the displays, a user purchase history acquisition unit that acquires the user purchase history, which is the history of purchase of the product and/or service by the user, a supplier progress history acquisition unit that acquires the supplier progress history, which is the progress history of supply of the product and/or service by the supplier, and a contribution degree calculator that calculates the degree of contribution of each of the displays associated with the actions of the user on the basis of the user action history, user purchase history, and supplier progress history.

3 Claims, 3 Drawing Sheets

CONTRIBUTION DEGREE CALCULATION SYSTEM AND COMPUTER PROGRAM PRODUCT

TECHNICAL FIELD

The present invention relates to a contribution degree calculation system and computer program product.

BACKGROUND ART

Conventionally, when a digital store, such as an EC site, or a real store on the street sells a product, it not only presents the product alone to customers, but also sells the product while making a "display," such as display of the product, representation of the product display space, or placement of an ornament, to produce sales promotion effects.

However, when a real store sells, for example, clothing, it is difficult to determine to what degree "displays," such as a mannequin, a hanger, decoration equipment, and display equipment, have contributed to sales promotion purposes.

This applies also to a digital store. For example, when a mannequin using a product is displayed, or an image obtained by replacing the face of the mannequin with a face image of the user is displayed on the screen of a user terminal, or a representation is made in the environment surrounding the mannequin, or a representation is made using display of the product, as described in Japanese Unexamined Patent Application Publication No. 2002-183542, it is difficult to determine to what degree the representation or the like has contributed to sales as a "display," compared to when the product alone is displayed on the screen of a user terminal. This difficulty in determining the degree of contribution makes it difficult for the manufacturer or supplier to actively make investment while objectively grasping cost-effectiveness.

As used herein, the term "display" refers to any type of means that mediates supply and purchase of a product and/or service between the user who considers the purchase of the product and/or service and the supplier that supplies the product and/or service and is an entity like a communication medium that smooths the distribution of the product and/or service.

The "display" not only contributes to the user, but also contributes to the manufacturer that produces the product or supplier in that it also provides information to the manufacturer or supplier. For example, if the product is "clothing," information indicating that the user wanted to buy a red M-size T-shirt but could not buy it due to it being out of stock and a red T-shirt of a size somewhat larger than M was present in the store is useful for the manufacturer or supplier that produces or supplies the product.

It is assumed that the user has purchased a red T-shirt with a longing for a scene in which they walk around the sea of Okinawa or considered the purchase thereof. Information on such a user's action allows a company that can provide the scene (for example, a travel agency, a hotel, a traffic company, a food or restaurant company, etc.) to provide useful information to the user. For this reason, there is a need to calculate the degree of contribution of a "display" serving as the useful information. However, it is difficult to correctly determine the degree of contribution of the information.

See Japanese Unexamined Patent Application Publication No. 2002-183542.

SUMMARY OF INVENTION

The present invention has been made in view of the above problem, and an object thereof is to provide a contribution degree calculation system and computer program product for calculating the degree of contribution of "displays" serving as means for mediating supply and purchase of a product and/or service between a user who considers purchase of the product and/or service and a supplier that supplies the product and/or service.

To accomplish the above object, a contribution degree calculation system according to the present invention is a contribution degree calculation system for calculating the degree of contribution of displays serving as means for mediating supply and purchase of a product and/or service between a user who considers purchase of the product and/or service and a supplier that supplies the product and/or service. The contribution degree calculation system includes a user action history acquisition unit configured to acquire a user action history that is a history of actions taken by the user through the displays, a user purchase history acquisition unit configured to acquire a user purchase history that is a history of purchase of the product and/or service by the user, a supplier progress history acquisition unit configured to acquire a supplier progress history that is a progress history of supply of the product and/or service by the supplier, and a contribution degree calculator configured to calculate the degree of contribution of each of the displays associated with the actions of the user on the basis of the user action history, the user purchase history, and the supplier progress history.

The contribution degree calculation system according to the present invention is able to calculate the degree of contribution of the displays from a comprehensive perspective.

In the contribution degree calculation system according to the present invention, the contribution degree calculator may include a user contribution degree calculator configured to calculate a user contribution degree that is the degree of contribution to the user of each of the displays associated with the actions of the user, on the basis of the user action history and the user purchase history and a supplier contribution degree calculator configured to calculate a supplier contribution degree that is the degree of contribution to the supplier of each of the displays associated with the actions of the user, on the basis of the user action history and the supplier progress history, and the contribution degree calculator may calculate the degree of contribution of each of the displays associated with the actions of the user on the basis of the user contribution degree and the supplier contribution degree.

The contribution degree calculation system according to the present invention is able to comprehensively calculate the degree of contribution of the displays from the perspectives of the user and supplier.

In the contribution degree calculation system according to the present invention, the supplier progress history may include a stage of providing a material for considering the product and/or service to be produced or invested in, a stage of starting production of or investment in the product and/or service, and a stage of achieving sales of the product and/or service.

The contribution degree calculation system according to the present invention is able to calculate the supplier contribution degree in the respective stages and to calculate the degree of contribution of the displays from a comprehensive perspective by taking into account the supplier contribution degree.

In the contribution degree calculation system according to the present invention, the user action history may include an auxiliary purchase history that is a history indicating that the user has considered purchase of the product and/or service but not purchased the product and/or service, and the contribution degree calculator may determine an auxiliary purchase level indicating the level of the possibility that the user may purchase the product and/or service, on the basis of the auxiliary purchase history and calculate the degree of contribution on the basis of the determined auxiliary purchase level.

The contribution degree calculation system according to the present invention is able to comprehensively calculate the degree of contribution of the displays by taking into account the auxiliary purchase level.

In the contribution degree calculation system according to the present invention, the degree of contribution calculated by the contribution degree calculator may include a direct contribution degree that is the degree of contribution in a case in which the user previously decided the product and/or service as a target to be purchased and a related contribution degree that is the degree of contribution in a case in which the user has purchased a product and/or service other than the product and/or service that the user previously decided as the target to be purchased.

Since the degree of contribution calculated by the contribution degree calculator includes the direct contribution degree and the related contribution degree, the contribution degree calculation system according to the present invention is able to calculate the degree of contribution from a comprehensive perspective.

To accomplish the above object, a contribution degree calculation system according to the present invention is a contribution degree calculation system for calculating the degree of contribution of displays serving as means for mediating supply and purchase of a product and/or service between a user who considers purchase of the product and/or service and a supplier that supplies the product and/or service. The contribution degree calculation system includes a user action history acquisition unit configured to acquire a user action history that is a history of actions taken by the user through the displays, a user purchase history acquisition unit configured to acquire a user purchase history that is a history of purchase of the product and/or service by the user, a supplier progress history acquisition unit configured to acquire a supplier progress history that is a progress history of supply of the product and/or service by the supplier, a purchase aspect determination unit configured to determine that a particular product and/or service is a product and/or service previously decided by the user as a target to be purchased, on the basis of a history of actions with respect to the particular product and/or service included in the user action history acquired by the user action history acquisition unit and a history of a plurality of continuous purchases of the particular product and/or service included in the user purchase history acquired by the user purchase history acquisition unit and to determine whether the user has purchased the determined particular product and/or service, and a contribution degree calculator configured to, when the purchase aspect determination unit determines that the user has purchased the particular product and/or service previously decided by the user as the target to be purchased, calculate a direct contribution degree that is the degree of contribution of a display used when the user has purchased the particular product and/or service, to, when the purchase aspect determination unit determines that the user has purchased a product and/or service other than the particular product and/or service previously decided by the user as the target to be purchased, calculate a related contribution degree by adding the degree of contribution of a display used when the user previously decided the particular product and/or service as the target to be purchased, the degree of contribution of a display used when the user has purchased the product and/or service other than the particular product and/or service, and the degree of contribution of a display that has guided the user from purchase of the particular product and/or service previously decided by the user as the target to be purchased to purchase of the product and/or service other than the particular product and/or service, and to calculate the degree of contribution of the displays on the basis of the direct contribution degree and the related contribution degree.

The contribution degree calculation system according to the present invention is able to calculate the degree of contribution from a comprehensive perspective on the basis of the direct contribution degree and the related contribution degree.

In the contribution degree calculation system according to the present invention, the contribution degree calculator may calculate relatedness between the previously decided particular product and/or service and the product and/or service other than the particular product and/or service in a case in which the user has been guided from purchase of the particular product and/or service previously decided by the user as the target to be purchased to purchase of the product and/or service other than the particular product and/or service, by using a relation level that is an index whose value is increased as the relatedness is increased.

Since the contribution degree calculator calculates the relatedness by using the relation level, the contribution degree calculator of the contribution degree calculation system according to the present invention is able to calculate the related contribution degree accurately.

In the contribution degree calculation system according to the present invention, the contribution degree calculation system may further include an auxiliary purchase history determination unit configured to determine whether the user action history acquired by the user action history acquisition unit includes an auxiliary purchase history indicating that the user has considered purchase of the product and/or service but not purchased the product and/or service, and an auxiliary purchase level determination unit configured to, when the auxiliary purchase history determination unit determines that the auxiliary purchase history is included, determine an auxiliary purchase level indicating the level of the possibility that the user may purchase the product and/or service, on the basis of the auxiliary purchase history. The contribution degree calculator calculates the degree of contribution of the displays by taking into account the auxiliary purchase level of the user determined by the auxiliary purchase level determination unit.

The contribution degree calculation system according to the present invention is able to comprehensively calculate the degree of contribution of the displays by taking into account the auxiliary purchase level.

In the contribution degree calculation system according to the present invention, the auxiliary purchase level determination unit may use, as a reference value, the auxiliary purchase level in a case in which there is no possibility that the user may purchase the product and/or service and calculates a value of the auxiliary purchase level such that the value becomes larger with respect to the reference value as the possibility that the user may purchase the product and/or service is increased.

The contribution degree calculation system according to the present invention is able to comprehensively calculate the degree of contribution of the displays by taking into account the auxiliary purchase level.

A computer program product according to the present invention is a computer program product for calculating the degree of contribution of displays serving as means for mediating supply and purchase of a product and/or service between a user who considers purchase of the product and/or service and a supplier that supplies the product and/or service. The computer program product causes a computer to function as user action history acquisition means configured to acquire a user action history that is a history of actions taken by the user through the displays, user purchase history acquisition means configured to acquire a user purchase history that is a history of purchase of the product and/or service by the user, supplier progress history acquisition means configured to acquire a supplier progress history that is a progress history of supply of the product and/or service by the supplier, and contribution degree calculation means configured to calculate the degree of contribution of each of the displays associated with the actions of the user on the basis of the user action history, the user purchase history, and the supplier progress history.

The computer program product according to the present invention is able to calculate the degree of contribution of the displays from a comprehensive perspective.

DESCRIPTION OF EMBODIMENTS

Now, an embodiment of the present invention will be described in detail with reference to the drawings.

Figure 1:
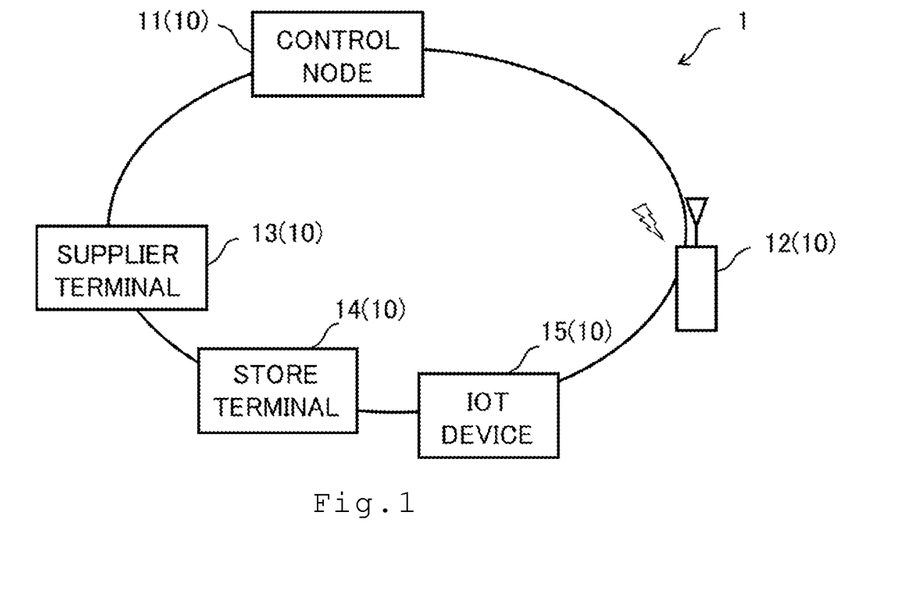
FIG. 1 is a diagram showing the overall configuration of a contribution degree calculation system according to an embodiment of the present invention.

FIG. 1 is a diagram showing the overall configuration of a contribution degree calculation system 1 according to the embodiment of the present invention. As shown in FIG. 1, the contribution degree calculation system 1 includes multiple nodes 10 forming a blockchain network 20. The nodes 10 include a control node 11 that controls the entire contribution degree calculation system 1, a user terminal 12 owned by a user who considers the purchase of a product and/or service, a supplier terminal 13 owned by a supplier that supplies the product and/or service, a store terminal 14, such as a personal computer or accounting register, installed in a real store that sells the product and/or service or owned by a vendor that operates an EC site, and an IOT device 15, such as a sensor or camera, included in IOT. The nodes 10 are configured to be able to communicate with each other through the blockchain network 20. The user terminal 12 and supplier terminal 13 are, for example, communication terminals such as personal computers or portable information terminals.

In the present embodiment, the term "displays" refers to means that mediate the supply and purchase of the product and/or service between the user who considers the purchase of the product and/or service and the supplier that supplies the product and/or service and are entities like media that smooth the platform when the user considers the purchase of the product and/or service and smooth the distribution of the product and/or service. That is, the displays can be regarded as communication media between the user and supplier.

Specifically, the "displays" include all entities that serve as the contact between the user and supplier. For example, all environments that serve as the contact between the user who is thirsty and wants to drink water and the supplier that wants to supply drinking water can be "displays." In this case, a vending machine, a map indicating where in the town tap water is provided, information on drink sale by a store, and the like correspond to "displays."

In the case of a real store, display of a product, decoration equipment for promoting the purchase of the product, and the like correspond to "displays." In the case of a clothing store, a mannequin corresponds to a "display."

Next, the configuration of the control node 11 will be described. The control node 11 is a computer having a communication function and includes, as hardware, a CPU, a storage device including RAM, ROM, and hard disk, a communication interface that controls communication through the blockchain network 20, and input/output interfaces such as a keyboard and a display. Software such as various types of data, databases and programs are stored in the storage device of the control node 11. Examples of the data stored in the storage device of the control node 11 include various types of user information on the user, the history of actions of the user collected from the user terminal 12, IOT device 15, and the like, the user purchase history, which is the history of purchase of the product and/or service by the user, and the supplier progress history, which is the progress history of supply of the product and/or service by the supplier.

Figure 2:
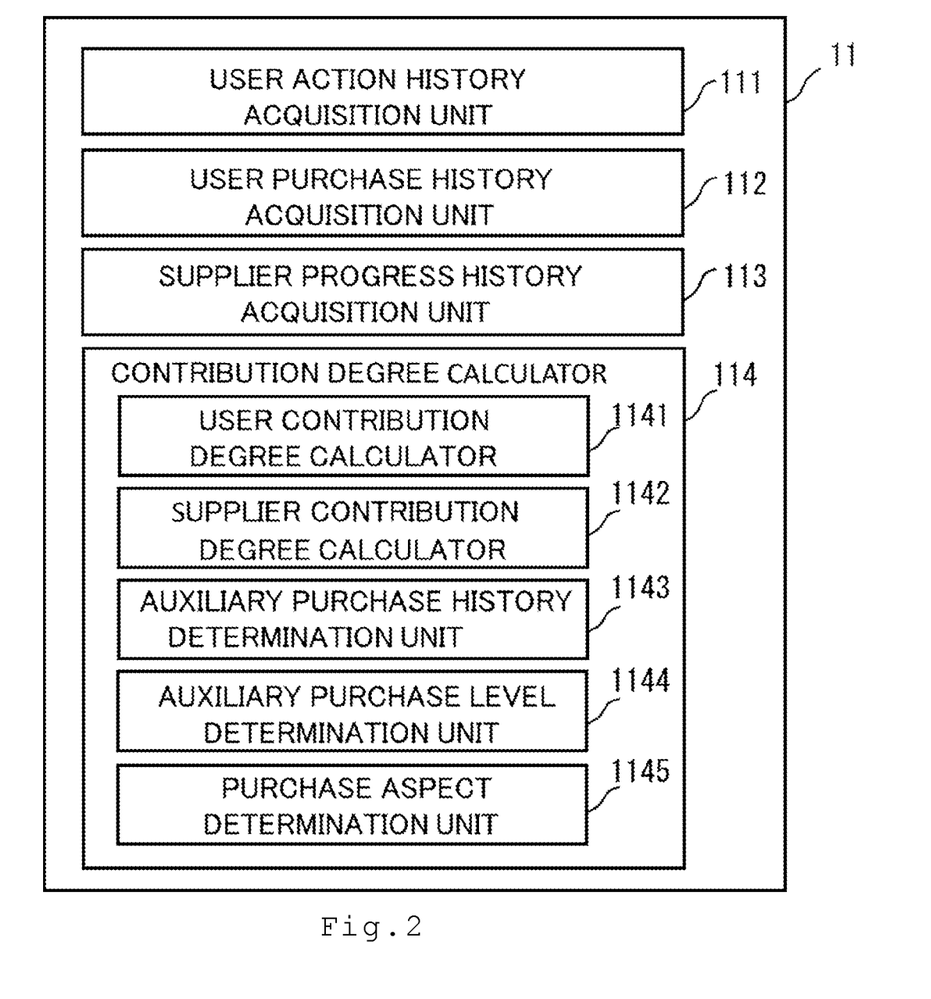
FIG. 2 is a diagram showing the functional elements of a control node of the contribution degree calculation system according to the embodiment.

Examples of the programs stored in the storage device of the control node 11 include a program for collecting the user action history, user purchase history, supplier progress history, and the like and storing them in a database. and a program for calculating the degree of contribution of "displays" on the basis of various types of information. When the CPU of the control node 11 performs processing in accordance with the software stored in the storage device, functional elements shown in FIG. 2 are implemented on the control node 11.

A user action history acquisition unit 111 acquires the history of actions taken by the user through "displays" (hereafter referred to as the "user action history").

Specifically, the user action history acquisition unit 111 acquires the personal information of the user, various types of information on the product and/or service displayed on the screen, the place in which the user is staying, and information on actions such as a touch or try-on of the product by the user in a real store, from the user terminal 12, the store terminal 14, the IOT device 15 such as a sensor or camera, and the like through the blockchain network 20.

Examples of the "various types of information on the product and/or service displayed on the screen" include information indicating that the user has taken an action such as an operation of displaying a try-on image, a combination image of a clothing use scene serving as the background with the try-on image, or the like on the screen of the user terminal 12 or an operation of simulating clothing that matches the user or use scene in order to comparatively evaluating clothing that may be purchased by the user.

The user action history acquisition unit 111 sequentially stores the acquired pieces of information in a database provided in the storage device as the user action history.

The user action history includes the auxiliary purchase history, which is a history indicating that the user has considered the purchase of the product and/or service but not purchased it.

If the user has purchased the product and/or service, it is easy to determine the degree of contribution of the purchase price or the like of the product and/or service. On the other hand, there are cases in which the user has considered the purchase of the product and/or service but not purchased it. In such cases, the "auxiliary purchase history" is used to evaluate the degree of contribution.

A user purchase history acquisition unit 112 acquires the user purchase history, which is the history of purchase of the product and/or service by the user, from the user terminal 12, the store terminal 14, the IOT device 15 such as a sensor or camera, and the like through the blockchain network 20 and sequentially stores it in the database provided in the storage device.

A supplier progress history acquisition unit 113 acquires the supplier progress history, which is the progress history of supply of the product and/or service by the supplier, from the supplier terminal 13, the store terminal 14, the IOT device 15 such as a sensor or camera, and the like through the blockchain network 20.

The "supplier progress history" include a stage of providing materials for considering the product and/or service to be produced or invested in, a stage of starting the production of or investment in the product and/or service, and a stage of achieving the sales of the product and/or service. The process from planning through production to the sale of the product and/or service often takes time, and it often takes time until the sales of the product and/or service are achieved in the final stage and thus the degree of contribution to the supplier of the "display" is determined. For this reason, in the present embodiment, the degree of contribution is calculated in the three stages.

A contribution degree calculator 114 calculates the degree of contribution of each of displays associated with the actions of the user on the basis of the user action history, user purchase history, and supplier progress history.

More specifically, the contribution degree calculator 114 includes a user contribution degree calculator 1141 and a supplier contribution degree calculator 1142.

The user contribution degree calculator 1141 calculates the user contribution degree, which is the degree of contribution to the user of each of the displays associated with the actions of the user, on the basis of the user action history and user purchase history.

The supplier contribution degree calculator 1142 calculates the supplier contribution degree, which is the degree of contribution to the supplier of each of the displays associated with the actions of the user, on the basis of the user action history and supplier progress history. Specifically, the supplier contribution degree calculator 1142 calculates to what degree each "display" has contributed to the supplier in each of the above stages (the stage of providing materials for considering the product and/or service to be produced or invested in, the stage of starting the production of or investment in the product and/or service, and the stage of achieving the sales of the product and/or service) by making comparisons between the user action history and the respective stages of the supplier progress history.

The contribution degree calculator 114 comprehensively calculates the degree of contribution of each of the "displays" associated with the actions of the user on the basis of the user contribution degree calculated by the user contribution degree calculator 1141 and the supplier contribution degree calculated by the supplier contribution degree calculator 1142.

The contribution degree calculator 114 determines the auxiliary purchase level indicating the level of the possibility that the user may purchase the product and/or service, on the basis of the auxiliary purchase history and calculates the degree of contribution on the basis of the determined auxiliary purchase level.

More specifically, the contribution degree calculator 114 includes an auxiliary purchase history determination unit 1143 and an auxiliary purchase level determination unit 1144. The auxiliary purchase history determination unit 1143 determines whether the user action history acquired by the user action history acquisition unit 111 includes an auxiliary purchase history indicating that the user has considered the purchase of the product and/or service but not purchased it. If the auxiliary purchase history determination unit 1143 determines that an auxiliary purchase history is included, the auxiliary purchase level determination unit 1144 determines the auxiliary purchase level indicating the level of the possibility that the user may purchase the product and/or service, on the basis of the auxiliary purchase history. The contribution degree calculator 114 calculates the degree of contribution of the "displays" by taking into consideration the auxiliary purchase level of the user determined by the auxiliary purchase level determination unit 1144.

For example, if there is no possibility that the user may purchase the product and/or service, the contribution degree calculator 114 determines that the auxiliary purchase level is "0"; if the user has purchased the product and/or service, it determines that the auxiliary purchase level is "10." Also, the contribution degree calculator 114 determines that the auxiliary purchase level is an intermediate level of "1" to "9," in accordance with the level of the possibility that the user may purchase the product and/or service.

For example, it is assumed that the user has wavered between drinks A and B and decided to buy one of them next time. In this case, the contribution degree calculator 114 determines that the auxiliary purchase level is "3."

Also, it is assumed that the user has tried on shoes for purchase but put the purchase on hold due to desired shoes being out of stock. In this case, the contribution degree calculator 114 determines that the auxiliary purchase level is "8."

Also, it is assumed that the user has considered the purchase of a personal computer but been quite dissatisfied with the personal computer. In this case, the contribution degree calculator 114 determines that the auxiliary purchase level is "1."

Also, it is assumed that the user has seen an advertisement describing a watch but not wanted to buy it at all. In this case, the contribution degree calculator 114 determines that the auxiliary purchase level is "0."

The contribution degree calculator 114 comprehensively calculates the degree of contribution by taking into account the determined auxiliary purchase level.

The contribution degree calculator 114 separately calculates the degree of contribution in a case in which the user previously decided the product and/or service as a target to be purchased ("intended purchase") (hereafter referred to as the "direct contribution degree") and the degree of contribution in a case in which the user has purchased a product and/or service other than the product and/or service previously decided by the user as the target to be purchased (hereafter referred to as the "related contribution degree")

and calculates the degree of contribution from a comprehensive perspective on the basis of the direct contribution degree and the related contribution degree.

More specifically, the contribution degree calculator 114 includes a purchase aspect determination unit 1145. The purchase aspect determination unit 1145 determines that a particular product and/or service is a product and/or service previously decided by the user as the target to be purchased, on the basis of the history of actions with respect to the particular product and/or service included in the user action history acquired by the user action history acquisition unit 111 and the history of multiple continuous purchases of the particular product and/or service included in the user purchase history acquired by the user purchase history acquisition unit 112 and determines whether the user has purchased the determined particular product and/or service.

If the purchase aspect determination unit 1145 determines that the user has purchased the particular product and/or service previously decided by the user as the target to be purchased, the contribution degree calculator 114 calculates the direct contribution degree, which is the degree of contribution of a "display" used when the user has purchased the particular product and/or service.

On the other hand, if the purchase aspect determination unit 1145 determines that the user has purchased a product and/or service other than the particular product and/or service previously decided by the user as the target to be purchased, the contribution degree calculator 114 calculates the related contribution degree by adding the degree of contribution of a "display" used when the user previously decided the particular product and/or service as the target to be purchased, the degree of contribution of a "display" used when the user has purchased the product and/or service other than the particular product and/or service, and the degree of contribution of a "display" that has guided the user from purchase of the particular product and/or service previously decided by the user as the target to be purchased to purchase of the product and/or service other than the particular product and/or service.

The contribution degree calculator 114 calculates the degree of contribution of the "displays" on the basis of the direct contribution degree and the related contribution degree.

Specifically, the term "direct contribution degree" refers to the degree of contribution in a case in which the user previously decided to purchase a product A or in a case in which the user has usually purchased a product with the same model number. In such a case, the degree of assistance of a "display" serving as a purchase communication medium to the user is often low.

For example, it is assumed that the user previously decided to purchase a particular number of products A with the same model number on a particular delivery date before contacting a "display" and has actually purchased the particular number of products A with the same model number on the particular delivery date. In this case, the contribution degree calculator 114 calculates a low degree of contribution with respect to the "display."

On the other hand, it is assumed that a change has been made to the purchase of the products A by some "display" such as a discount recommendation based on a different color, a different size, or delivery date adjustment. In this case, the contribution degree calculator 114 calculates the degree of contribution of the "display" in accordance with the degree of change. Even if the user has an intention of purchasing the products A, they may waver in deciding the purchase now. At this time, if any "display" assists the user in finally deciding the purchase, a high degree of contribution is calculated with respect to the "display." Also, even if the user previously decided to purchase the products A, they may not be able to easily decide the purchase. In this case, the user may finally decide the purchase by obtaining a "display" for making a comparison between products B and the products A, or may decide the purchase of the products A by obtaining a "display" related to any environment or a change in the user themself in which the products A are being used.

Also, it is assumed that analysis of the user action history has revealed that the user tried on or touched clothing or tried on or made comparisons between various clothing patterns at a real store or EC site and thus it has been determined that the user took many actions with respect to the clothing really or virtually. In this case, the contribution degree calculator 114 calculates a high degree of contribution with respect to the real store or EC site serving as a "display."

The contribution degree calculator 114 may set a parameter for each of factors forming each action of the user and calculate a contribution level of 0% to 100%, a contribution value of 120, 200, or 300, or the like.

On the other hand, the term "related contribution degree" refers to the degree of contribution of a "display" with reference to which the user has purchased a product and/or service other than and related to a product and/or service that the user was scheduled to purchase.

In other words, the "related contribution degree" refers to the degree of contribution of a separately provided "display" with reference to which the user has purchased a related product and/or service suggested by a product and/or service that they are scheduled to purchase or a related product and/or service recommended as a product and/or service that is used concurrently with the scheduled product and/or service.

For example, it is assumed that the user has purchased a single product A that the user was originally scheduled to purchase and a single product B that the user was not originally scheduled to purchase. In this case, the degree of contribution of the "displays" is obtained by adding "A→B (the contribution of a display that has guided the user from the product A to the product B)" to "the contribution of a display that has assisted the user in purchasing the product A+the contribution of a display that has assisted the user in purchasing the product B." One specific example is that the product A is a cup and the product B is a penlight, which appears to be less related to the tea cup; there is a "display" in which food is eaten using the cup and a "display" that introduces equipment used during a disaster; and thus the user purchases the penlight with reference to the "display" of the penlight.

The "related contribution degree" is classified into two patterns: the degree of contribution concerning the "relation between products" and the degree of contribution concerning the "relation between information providing media."

The term "relation between products" refers to the relation between the product A and product B in a case in which the user was scheduled to purchase the product A but has purchased also the product B due to a "display."

On the other hand, the term "relation between information providing media" refers to the relation between information providing media such as an advertisement, a real store, and an EC site. For example, it is assumed that the user has seen an advertisement, made purchase at a real store introduced by the advertisement, visited an EC site, and purchased a product A. In this case, "displays" are used in each information providing media "advertisement," "real store," and "EC site." For this reason, the contribution degree calculator 114 calculates the degree of contribution to the purchase of the product A by the user, of the display of each information providing medium. For example, the contribution degree calculator 114 may calculate the degree of contribution of the "displays" to the purchase of the product A by the user as 20% for the advertisement, 30% for the real store, and 50% for the EC site. The contribution degree calculator 114 may calculate the degree of contribution in a numerical value such as 100, 200, or 350 in place of %.

When calculating the "related contribution degree," an index such as a relation level 0, 1, or 2 may be used.

For example, it is assumed that the user has purchased favorite fermented soybeans that they eat every day. In this case, the contribution degree calculator 114 determines that the relation level is "0."

Also, it is assumed that the user has purchased fermented soybean paste recommended by a local shop during a trip. In this case, the contribution degree calculator 114 determines that the relation level is "4."

Also, it is assumed that the user has purchased an introductory cooking book and additionally purchased a frying pan, which they were not originally scheduled to purchase. In this case, the contribution degree calculator 114 determines that the relation level is "5."

Also, it is assumed that the user was scheduled to purchase a red T-shirt; a travel agency has proposed an Okinawa trip to the user in relation to the red T-shirt through a "display"; and thus the user has decided to apply for the Okinawa trip. In this case, the contribution degree calculator 114 determines that the relation level is "6."

Also, it is assumed that the user was scheduled to purchase instant noodles; a "display" displaying a towel that may help the user eat the noodles has been made to the user in relation to the noodles; and the user has purchased both the noodles and towel. In this case, the contribution degree calculator 114 determines that the relation level is "8."

Also, it is assumed that the user was scheduled to purchase bath goods; a "display" displaying and proposing a spa hotel has been made to the user in relation to the bath goods; and the user has purchased a service of the spa hotel. In this case, the contribution degree calculator 114 determines that the relation level is "7."

Also, it is assumed that the user has purchased a food service at a restaurant venue; clothing suitable for the atmosphere of the venue has been displayed to the user; and the user has purchased the clothing. In this case, the contribution degree calculator 114 determines that the relation level is "7."

If the user uses multiple advertisement media, introduction media, EC sites, or the like, the contribution degree calculator 114 calculates the degree of contribution of each of the advertisement media or the like by analyzing the action history acquired by the user action history acquisition unit 111.

For example, it is assumed that the user has purchased a product along a route "A→B→C→purchase" where A is an advertisement medium, B is an EC site 1, and C is an EC site 2. In this case, the contribution degree calculator 114 calculates the degree of contribution of each of A, B, and C.

One specific example is that the user was attracted by the design of a T-shirt posted on an advertisement medium, checked the size, material, and fine parts of the T-shirt at the EC site 1 but suspended the check due to a lack of time, and, at a later date, remembered the T-shirt and decided to purchase it by trying it on at the EC site 2.

The same applies also to a case in which A, B, and C are real stores. One specific example is that the user was attracted by a product on an advertisement, picked up the product at a store 1 to check the size, parts, and the like but went home that day without trying it on, and, at a later date, tried on and purchases the product at a real store 2 that handles the same product.

The same applies also to a case in which A, B, and C consist of one or more real stores and one or more EC sites. Even if the user uses the one or more EC sites and real stores as described above, the user action history, user purchase history, supplier progress history, and the like are acquired from the supplier terminal 13, store terminal 14, IOT device 15, and the like through the blockchain network 20. Thus, the degree of contribution of the "displays" of the EC site(s), real store(s), advertisement(s), or the like is calculated.

Figure 3:
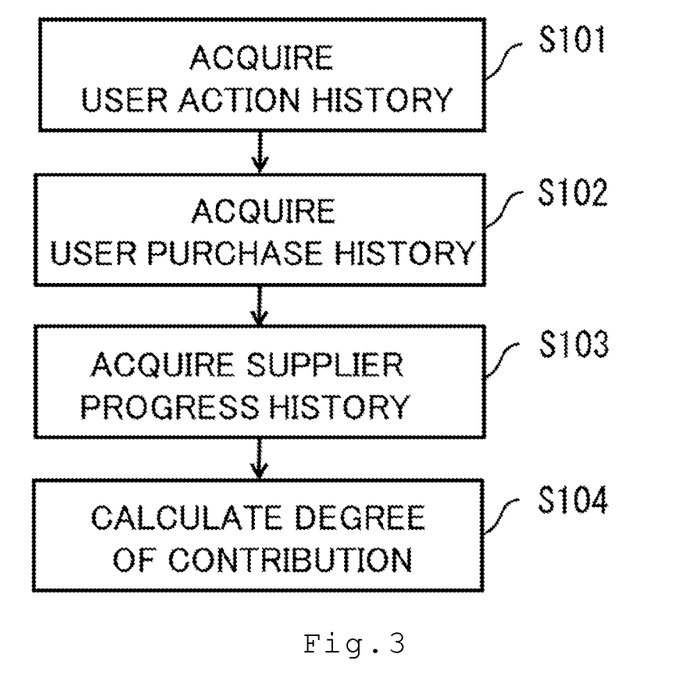
FIG. 3 is a flowchart showing a contribution degree calculation process performed by the contribution degree calculation system according to the embodiment.

Next, referring to a flowchart shown in FIG. 3, a contribution degree calculation process performed by the contribution degree calculation system 1 will be described.

The user action history acquisition unit 111 of the control node 11 acquires information on the actions taken by the user through various types of "displays" from the user terminal 12, the store terminal 14, the IOT device 15 such as sensor or camera, and the like through the blockchain network 20 and sequentially stores such information in the database provided in the storage device as the user action history (step S101).

When the user purchases the product and/or service, the user purchase history acquisition unit 112 of the control node 11 acquires information on the purchase from the user terminal 12, the store terminal 14, the IOT device 15 such as a sensor or camera, and the like through the blockchain network 20 and sequentially stores such information in the database provided in the storage device as the user purchase history (step S102).

The supplier progress history acquisition unit 113 of the control node 11 acquires the supplier progress history from the supplier terminal 13, the store terminal 14, the IOT device 15 such as a sensor or camera, and the like through the blockchain network 20, and sequentially stores it in the database provided in the storage device (step S103).

Then, the contribution degree calculator 114 calculates the degree of contribution of each of the "displays" associated with the actions of the user by making comparisons between the user action history acquired by the user action history acquisition unit 111, the user purchase history acquired by the user purchase history acquisition unit 112, and the supplier progress history acquired by the supplier progress history acquisition unit 113 (step S104).

Specifically, the user contribution degree calculator 1141 of the contribution degree calculator 114 calculates the user contribution degree, which is the degree of contribution to the user of each of the "displays" associated with the actions of the user by making comparisons between the user action history and user purchase history. The supplier contribution degree calculator 1142 thereof calculates the supplier contribution degree, which is the degree of contribution to the supplier of each of the displays associated with the actions of the user by making comparisons between the user action history and supplier progress history. The contribution degree calculator 114 then calculates the degree of contribution of each of the "displays" associated with the actions of the user on the basis of the user contribution degree and the supplier contribution degree.

At this time, the contribution degree calculator 114 determines the auxiliary purchase level on the basis of the auxiliary purchase history determined from the user action history and calculates the degree of contribution by taking into account the auxiliary purchase level, as well as calculates the degree of contribution of each "display" from a comprehensive perspective by taking into account the direct contribution degree and the related contribution degree.

As described above, the contribution degree calculation system 1 is able to calculate the degree of contribution of each "display" from a comprehensive perspective and thus helps the supplier or manufacturer of the product and/or service promote or manage the sale of the product and/or service.

The above embodiment is illustrative only, and the present invention can also be carried out by making various modifications to the embodiment without departing from the spirit and scope of the invention as set forth in the claims.

For example, the communication system of the contribution degree calculation system 1 is not limited to the blockchain communication in the above embodiment and may be, for example, pier-to-pier (P2P) communication or client-server communication, communication using a distributed storage blockchain, or a combination thereof.

While, in the above embodiment, the contribution degree calculation system 1 has been described as including the multiple nodes 10, the device configuration of the contribution degree calculation system 1 is not limiting. For example, the contribution degree calculation system 1 may consist of a single device or a client-server system. If the contribution degree calculation system 1 consists of a single device, this device may be a stand-alone device, which is not connected to a network such as the Internet.

What is claimed is:

1. A contribution degree calculation system for calculating a degree of contribution of at least one display associated with each of a user considering purchase of at least one of a product, a service, or a combination thereof and a supplier of at least of one of the product, the service, or the combination thereof, the at least one display is a communication medium for mediating supply and purchase of the at least one of a product, a service, or a combination thereof between the user considering purchase of the at least one of the product, the service, or the combination thereof and the supplier that supplies the at least one of the product, the service, or the combination thereof, the user purchasing the at least one of the product, the service, or the combination thereof at least via a user terminal associated with the user, the user terminal including at least an input device, a visual display device, and a camera, the calculation system, comprising:

the user terminal;
a supplier terminal;
a store terminal;
an internet-of-things connected device; and
a control system including a central processing unit communicatively coupled to a storage device, the control system, further, including a communication interface for communicatively coupling the control system to the user terminal, the supplier terminal, the store terminal, and the internet-of-things connected device, the control system, additionally, including:

a user action history acquisition subsystem configured to acquire a user action history of the user considering purchase of the at least one of a product, a service, or the combination thereof having been exposed to the at least one display via the user terminal, the supplier terminal, the store terminal, and the internet-of-things connected device, the user action history acquisition subsystem including a database stored in the storage device, the central processing unit searching for the user action history of the user considering purchase of the at least one of the product, the service, or the combination thereof having been exposed to the at least one display at a plurality of physical stores and at a plurality of online stores for storage in the database, the user action history of a respective user including a history of actions taken by the corresponding user exposed to the at least one display when the respective user previously purchased a product or a service at a physical store or at an online store, or a history of actions taken by the corresponding user exposed to the at least one display when the respective user, via the corresponding user terminal associated with the user, previously indicated a determination to purchase a product or a service at a physical store or at an online store, or a history of actions taken by the corresponding user exposed to the at least one display when the respective user, via the corresponding user terminal associated with the user, currently indicates a determination to purchase a product or a service at a physical store or at an online store, and the history of actions taken by the user exposed to the at least one display including at least one of the following: (a) image data or video data of the respective user's actions when trying on a product at a physical store, (b) image data or video data of the respective user's actions when touching a product at a physical store, (c) image data or video data of the respective user's actions when using a product at a physical store, (d) image data or video data of the respective user's actions when interacting with a product at an online store, or (e) image data or video data of the respective user's actions when experiencing a service at a physical store or at an online store;

a user purchase history acquisition subsystem configured to acquire a user purchase history of the user considering purchase of the at least one of a product, a service, or a combination thereof exposed to the at least one display via the user terminal, the supplier terminal, and the store terminal, the user purchase history acquisition subsystem including a database stored in the storage device, the central processing unit searching for the user purchase history of the user considering purchase of at least one of a product, a service, or a combination thereof exposed to the at least one display at a plurality of physical stores and at a plurality of online stores for storage in the database, the user purchase history of a respective user including a history of purchases of products or services associated with exposure to the at least one display by the corresponding user at a physical store or at an online store;

a supplier progress history acquisition subsystem configured to acquire a supplier progress history of a supplier that supplies at least one of a product, a service, or a combination thereof associated with the at least one display via the supplier terminal and the store terminal, the supplier progress history acquisition subsystem including a database stored in the storage device, the central processing unit searching for the supplier progress history of the supplier that supplies at least one of a product, a service, or a combination thereof associated the at least one display at a plurality of physical stores and at a plurality of online stores for storage in the database, the supplier progress history including a plurality of stages associated with a history of a corresponding product's supply, a corresponding service's supply or a combination thereof by the respective supplier associated with the at least one display, the plurality of stages include at least the following: (a) an initial stage wherein a material for manufacturing a product is being considered or wherein an investment is being considered for manufacturing a product or producing a service, (b) a mid-level stage wherein manufacture or production of a product has started or wherein investment in a product or a service has been completed, and (c) a final stage wherein sales of a product or a service has been completed; and a contribution degree calculator subsystem configured to calculate a degree of contribution of each display associated with actions of the user with respect to information corresponding to the user action history, the user purchase history, and the supplier progress history, the contribution degree calculator subsystem being communicatively coupled to the user action history acquisition subsystem, the user purchase history acquisition subsystem, and the supplier progress history acquisition subsystem, and including a user contribution degree calculator subsystem and a supplier contribution degree calculator subsystem, the user contribution degree calculator subsystem calculating a user contribution degree for a particular user as a degree of contribution by a corresponding display associated with actions of the particular user responsive to data indicative of the user action history and the user purchase history by the central processing unit, the supplier contribution degree calculator subsystem calculating a supplier contribution degree for a particular supplier as a degree of contribution to the supplier of each display associated with actions of a user considering purchase of at least one of a product, a service, or a combination thereof responsive to data indicative of the user action history and the supplier progress history by the central processing unit, the central processing unit, further, setting parameters for data associated with the user contribution degree and the supplier contribution degree corresponding to a particular display, and responsive to establishing the user contribution degree and the supplier contribution degree, the central processing unit calculatively determining a comprehensive degree of contribution of a particular display associated with actions of a user considering purchase of at least one of a product, a service, or a combination thereof on the basis of the user contribution degree and the supplier contribution degree to be either one of the following: (a) a low degree of contribution, or (b) a high degree of contribution, the central processing unit transmitting the calculated comprehensive degree of contribution of the at least one display to the supplier terminal, and the supplier terminal selectively changing the at least one display responsive to the calculated comprehensive degree of contribution.

2. The contribution degree calculation system of claim 1, wherein the user action history includes an auxiliary purchase history that is a history indicating that the user has considered purchase of the product or the service but not purchased the product or the service.

3. A non-transitory computer storage device for calculating a degree of contribution of at least one display associated with each of both a user considering purchase of at least one of a product, a service, or a combination thereof and a supplier of at least of one of the product, the service, or the combination thereof, the at least one display is a communication medium for mediating supply and purchase of at least one of a product, a service, or a combination thereof between the user considering purchase of the at least one of the product, the service, or the combination thereof and the supplier that supplies the at least one of the product, the service, or the combination thereof, the user purchasing the at least one of the product, the service, or the combination thereof at least via a user terminal associated with the user, the user terminal including at least an input device, a visual display device, and a camera, the computer storage device operating on a computer having a central processing unit and a storage unit, wherein the central processing unit is communicatively coupled to the storage unit, and the computer storage device operating on the computer, comprising:

configuring the central processing unit to establish a user action history acquisition subsystem configured to acquire a user action history of the user considering purchase of the at least one of a product, a service, or a combination thereof associated with the at least one display via the user terminal, a supplier terminal, and a store terminal, the user action history acquisition subsystem including a database stored in the storage unit, the central processing unit searching for the user action history of the user considering purchase of at least one of a product, a service, or a combination thereof associated with the at least one display at a plurality of physical stores and at a plurality of online stores for storage in the database, the user action history of a respective user including a history of actions taken by the corresponding user exposed to the at least one display when the respective user previously purchased a product or a service at a physical store or at an online store, or a history of actions taken by the corresponding user exposed to the at least one display when the respective user via the corresponding user terminal associated with the user previously indicated a determination to purchase a product or a service at a physical store or at an online store, or a history of actions taken by the corresponding user exposed to the at least one display when the respective user via the corresponding user terminal associated with the user currently indicates a determination to purchase a product or a service at a physical store or at an online store, and the history of actions taken by the user exposed to the at least one display including at least one of the following: (a) image data or video data of the respective user's actions when trying on a product at a physical store, (b) image data or video data of the respective user's actions when touching a product at a physical store, or (c) image data or video data of the respective user's actions when experiencing a service at a physical store or at an online store;

configuring the central processing unit to establish a user purchase history acquisition subsystem configured to acquire a user purchase history of the user considering purchase of the at least one of a product or a service associated with the at least one display via the user terminal, the supplier terminal, and the store terminal, the user purchase history acquisition subsystem including a database stored in the storage unit, the central processing unit searching for the user purchase history of the user considering purchase of at least one of a product, a service, or a combination thereof associated with the at least one display at a plurality of physical stores and at a plurality of online stores for storage in the database, the user purchase history of a respective user including a history of purchases of products or services associated with the at least one display by the corresponding user at a physical store or at an online store;

configuring the central processing unit to establish a supplier progress history acquisition subsystem configured to acquire a supplier progress history of a supplier that supplies at least one of a product, a service, or a combination thereof associated with the at least one display via the supplier terminal and the store terminal, the supplier progress history acquisition subsystem including a database stored in the storage unit, the central processing unit searching for the supplier progress history of the supplier that supplies at least one of a product, a service, or a combination thereof associated with the at least one display at a plurality of physical stores and at a plurality of online stores for storage in the database, the supplier progress history including a plurality of stages associated with a history of a corresponding product's supply, a corresponding service's supply, or a combination thereof by the respective supplier associated with the at least one display, the plurality of stages include at least the following: (a) an initial stage wherein a material for manufacturing a product is being considered or wherein an investment is being considered for manufacturing a product or producing a service, (b) a mid-level stage wherein manufacture or production of a product has started or wherein investment in a product or a service has been completed, and (c) a final stage wherein sales of a product or a service has been completed; and configuring the central processing unit to establish a contribution degree calculation subsystem configured to calculate a degree of contribution of each display associated with actions of the user with respect to information corresponding to the user action history, the user purchase history, and the supplier progress history, the contribution degree calculator subsystem being communicatively coupled to the user action history acquisition subsystem, the user purchase history acquisition subsystem, and the supplier progress history acquisition subsystem, and including a user contribution degree calculator subsystem and a supplier contribution degree calculator subsystem, the user contribution degree calculator subsystem calculating a user contribution degree for a particular user as a degree of contribution by a corresponding display associated with actions of the particular user responsive to data indicative of the user action history and the user purchase history by the central processing unit, the supplier contribution degree calculator subsystem calculating a supplier contribution degree for a particular supplier as a degree of contribution to the supplier of each display associated with actions of a user considering purchase of at least one of a product, a service, or a combination thereof responsive to data indicative of the user action history and the supplier progress history by the central processing unit, the central processing unit, further, setting parameters for data associated with the user contribution degree and the supplier contribution degree corresponding to a particular display, and responsive to analyzing the user contribution degree and the supplier contribution degree, the central processing unit calculatively determining a comprehensive degree of contribution of a particular display associated with actions of a user considering purchase of at least one of a product, a service, or a combination thereof on the basis of the user contribution degree and the supplier contribution degree to be either one of the following: (a) a low degree of contribution, or (b) a high degree of contribution, the central processing unit transmitting the calculated comprehensive degree of contribution of the at least one display to the supplier terminal, and the supplier terminal selectively changing the at least one display responsive to the calculated comprehensive degree of contribution.

* * * * *